(12) United States Patent
Shibata (10) Patent No.: US 8,939,619 B2
(45) Date of Patent: Jan. 27, 2015

(54) VEHICULAR HEADLAMP

(75) Inventor: Hiroki Shibata, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 128 days.

(21) Appl. No.: 13/431,238

(22) Filed: Mar. 27, 2012

(65) Prior Publication Data

US 2012/0257400 A1   Oct. 11, 2012

(30) Foreign Application Priority Data

Apr. 8, 2011   (JP) ................. 2011-086721

(51) Int. Cl.
| | | |
|---|---|---|
| G01B 5/00 | (2006.01) | |
| G01B 13/18 | (2006.01) | |
| G01B 21/22 | (2006.01) | |
| G01D 21/00 | (2006.01) | |
| F21V 19/02 | (2006.01) | |
| F21V 21/14 | (2006.01) | |
| B60Q 1/00 | (2006.01) | |
| B60Q 3/00 | (2006.01) | |
| F21V 11/00 | (2006.01) | |
| F21V 15/01 | (2006.01) | |
| F21S 8/10 | (2006.01) | |
| B60Q 1/076 | (2006.01) | |
| B60Q 1/068 | (2006.01) | |

(52) U.S. Cl.
CPC ............. *F21S 48/1721* (2013.01); *B60Q 1/076* (2013.01); *B60Q 1/068* (2013.01); *F21S 48/1216* (2013.01); *F21S 48/1104* (2013.01); *F21S 48/1159* (2013.01)
USPC ............ 362/460; 362/523; 362/538; 362/546

(58) Field of Classification Search
USPC .......................... 362/460, 512, 523–549, 515
See application file for complete search history.

(56) References Cited

U.S. PATENT DOCUMENTS

| | | | | |
|---|---|---|---|---|
| 5,188,444 A | * | 2/1993 | Makita et al. ................. | 362/519 |
| 5,833,346 A | * | 11/1998 | Denley .......................... | 362/507 |
| 7,004,607 B2 | * | 2/2006 | Aguinaga ..................... | 362/528 |
| 7,537,366 B2 | * | 5/2009 | Inoue et al. ................... | 362/547 |

(Continued)

FOREIGN PATENT DOCUMENTS

| | | |
|---|---|---|
| EP | 1234716 | 8/2002 |
| JP | 2008-257959 | 10/2008 |

OTHER PUBLICATIONS

Chinese Office Action—Chinese Application No. 2012110097721.X issued on Jan. 6, 2014, citing US20080247182 and EP1234716.

*Primary Examiner* — Ismael Negron
*Assistant Examiner* — Erin Kryukova
(74) *Attorney, Agent, or Firm* — Cantor Colburn LLP (57) ABSTRACT

Provided is a vehicular headlamp that includes a light source unit, a reflector, a heat sink, a fixation frame fixed inside an external case of a lamp, a movable frame supported on the fixation frame to be movable in a vertical direction, a lens unit including a projection lens and a lens holder and supported on the movable frame to be movable in a horizontal direction, a first aiming operating shaft that performs optical axis adjustment, and a second aiming operating shaft that performs the optical axis adjustment. In particular, the lens unit moves in the horizontal direction and the vertical direction with respect to the fixation frame while a distance from a focus of light reflected by the reflector to the projection lens is constant, and the light source unit is fixed to the lamp housing while the heat sink is positioned outside the external case.

16 Claims, 7 Drawing Sheets

(56) References Cited

U.S. PATENT DOCUMENTS

| | | | |
|---|---|---|---|
| 7,618,174 B2* | 11/2009 | Yasuda et al. | 362/545 |
| 7,658,523 B2* | 2/2010 | Sugimoto | 362/526 |
| 2005/0122735 A1* | 6/2005 | Watanabe et al. | 362/539 |
| 2008/0112179 A1* | 5/2008 | Tatara et al. | 362/515 |
| 2008/0247177 A1* | 10/2008 | Tanaka et al. | 362/373 |
| 2008/0247182 A1 | 10/2008 | Yasuda et al. | |
| 2011/0063866 A1* | 3/2011 | Shibata et al. | 362/523 |

* cited by examiner

VEHICULAR HEADLAMP

CROSS-REFERENCE TO RELATED APPLICATIONS

This application is based on and claims priority from Japanese Patent Application No. 2011-086721, filed on Apr. 8, 2011, with the Japanese Patent Office, the disclosure of which is incorporated herein in its entirety by reference.

TECHNICAL FIELD

The present disclosure relates to a vehicular headlamp. Specifically, the present disclosure relates to a technical field that improves heat dissipating performance after ensuring internal airtightness of an external case of a lamp by fixing a light source unit to a lamp housing in a state where a heat sink is positioned outside the external case of a lamp.

BACKGROUND

A vehicular headlamp is constituted by a lamp unit disposed in an external case of a lamp constituted by, for example, a cover and a lamp housing. The lamp unit includes a lens unit having a projection lens that projects light emitted from a light source to project the light to the front and a lens holder that holds the projection lens.

A vehicular headlamp may have a heat sink for dissipating heat generated when a light source is driven, that is, when light is emitted from the light source. See, for example, Japanese Patent Application Laid-Open No. 2008-257959.

An aiming adjusting mechanism that adjusts a direction of an optical axis at the time of delivering or examining a vehicle is provided in the vehicular headlamp and an aiming operating shaft of the aiming adjusting mechanism rotates in a circumferential direction of the shaft to rotate the lamp unit in a vertical direction or a horizontal direction, thereby adjusting the direction of the optical axis.

In the vehicular headlamp disclosed in Japanese Patent Application Laid-Open No. 2008-257959, the lens unit and the heat sink are attached to a frame disposed inside the external case of a lamp and the heat sink protrudes rearward from a protrusion hole formed in the lamp housing. The aiming operating shaft is screw-joined to the frame and the aiming operating shaft rotates to integrally tilt the frame, the lens unit and the heat sink, thereby adjusting the direction of the optical axis.

In the vehicular headlamp, the heat generated when the light source is driven is discharged to the outside through the heat sink that protrudes rearward from the lamp housing to ensure an excellent heat dissipating performance. The heat generated when the light source is driven is discharged to the outside to suppress an increase in temperature of the light source, thereby ensuring a normal driving state of the light source.

SUMMARY

However, in the vehicular headlamp disclosed in Japanese Patent Application Laid-Open No. 2008-257959, the heat sink is tilted together with the lens unit when an aiming adjustment is performed, such that a clearance between the heat sink and the lamp housing may be generated.

When the clearance between the heat sink and the lamp housing is generated, internal airtightness of the external case of a lamp deteriorates, such that dust or moisture penetrates the inside of the external case of a lamp. Therefore, the intensity of light irradiated to the front may deteriorate or a smooth operation of each part may be interrupted.

Therefore, the present disclosure has been made in an effort to improve heat dissipating performance after ensuring internal airtightness of an external case of a lamp.

An exemplary embodiment of the present disclosure provides a vehicular headlamp in which a lamp unit is disposed in an external case of a lamp constituted by a lamp housing having an opening and a cover that covers the opening of the lamp housing. The lamp unit includes a light source unit including a light source, a light source placing part in which the light source is placed, a reflector that reflects light emitted from the light source, and a heat sink that dissipates the heat generated when the light source is driven, a fixation frame fixed in the external case of a lamp, a movable frame supported on the fixation frame to be movable in one of a horizontal direction and a vertical direction in the external case of a lamp, a lens unit including a projection lens that projects the light emitted from the light source and a lens holder that holds the projection lens and supported on the movable frame to be movable in the other direction of the horizontal direction and the vertical direction in the external case of a lamp, a first aiming operating shaft that performs optical axis adjustment by moving the movable frame in the one of the horizontal direction and the vertical direction with respect to the fixation frame, and a second aiming operating shaft that performs the optical axis adjustment by moving the lens unit in the other direction of the horizontal direction and the vertical direction with respect to the movable frame. The lens unit moves in the horizontal direction and the vertical direction with respect to the fixation frame in a state where a distance from a focus of the light emitted from the light source and reflected by the reflector to the projection lens is constant, and the light source unit is fixed to the lamp housing in a state where the heat sink is positioned outside the external case of a lamp.

Accordingly, in the vehicular headlamp of the present disclosure, the light source unit having the heat sink does not move with respect to the lamp housing during the aiming adjustment.

According to the present disclosure, a vehicular headlamp is provided in which a lamp unit is disposed in an external case of a lamp constituted by a lamp housing having an opening and a cover that covers the opening of the lamp housing. The lamp unit includes a light source unit that includes a light source, a light source placing part in which the light source is placed, a reflector that reflects the light emitted from the light source, and a heat sink that dissipates the heat generated when the light source is driven, a fixation frame fixed in the external case of a lamp, a movable frame supported on the fixation frame to be movable in one of a horizontal direction and a vertical direction in the external case of a lamp, a lens unit including a projection lens that projects the light emitted from the light source and a lens holder that holds the projection lens and supported on the movable frame to be movable in the other direction of the horizontal direction and the vertical direction in the external case of a lamp, a first aiming operating shaft that performs an optical axis adjustment by moving the movable frame in the one of the horizontal direction and the vertical direction with respect to the fixation frame, and a second aiming operating shaft that performs the optical axis adjustment by moving the lens unit in the other direction of the horizontal direction and the vertical direction with respect to the movable frame. Furthermore, the lens unit moves in the horizontal direction and the vertical direction with respect to the fixation frame in a state where a distance from a focus of the light emitted from the light source and reflected by the reflector to the projection lens is constant, and the light source unit is fixed to the lamp housing in a state where the heat sink is positioned outside the external case of a lamp.

Accordingly, when the aiming adjustment is performed, the heat sink does not move together with the lens unit, such that heat dissipating performance can be improved after ensuring internal airtightness of the external case of a lamp.

The vehicular headlamp according to the present disclosure further includes a leveling actuator including a body part and a driving part, that is movable in the vertical direction with respect to the body part and is connected to the movable frame or the lens unit, and configured to be movable in the vertical direction with the respect to the fixation frame and perform the optical axis adjustment. The first aiming operating shaft or the second aiming operating shaft rotates in a shaft circumferential direction, such that the leveling actuator moves in the vertical direction with the fixation frame, and the lens unit moves in the vertical direction with respect to the fixation frame according to the movement of the leveling actuator.

Accordingly, the leveling adjustment and the aiming adjustment can be independently performed without interfering with each other, and as a result, appropriateness and reliability of an optical axis adjusting operation can be improved.

The vehicular headlamp according to the present disclosure further includes a driving circuit that drives the light source in the light source unit.

Accordingly, since the driving circuit and the light source that is driven by the driving circuit are provided in a single light source unit, a manufacturing cost can be reduced and miniaturization can be achieved.

The vehicular headlamp according to the present disclosure further includes a connection member including a connection part connected to the lens unit and configured to be movable integrally with the lens unit in one of the horizontal direction and the vertical direction by operating the first aiming operating shaft or the second aiming operating shaft. The lens unit moves in the other direction of the horizontal direction and the vertical direction with respect to the connection member.

Accordingly, an unnecessary load is not applied to the lens unit from the connection member when the lens unit moves, such that the lens unit can smoothly move.

In the vehicular headlamp according to the present disclosure, a connector that supplies driving current to the light source is attached to a portion positioned in the rear of the center of the projection lens in the lamp housing, and the first aiming operating shaft or the second aiming operating shaft is positioned at a left side or a right side of a vertical line that passes through the center of the projection lens.

Accordingly, when the first aiming operating shaft or the second aiming operating shaft is operated by a jig, the connector does not interfere with the jig, such that an excellent operability can be ensured when the first aiming operating shaft or the second aiming operating shaft is operated using the jig.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an embodiment for implementing a vehicular headlamp of the present disclosure will be described with reference to the accompanying drawings.

A vehicular headlamp 1 is attached to and disposed in each of both left and right portions at a front end portion of a vehicle body.

Figure 1:
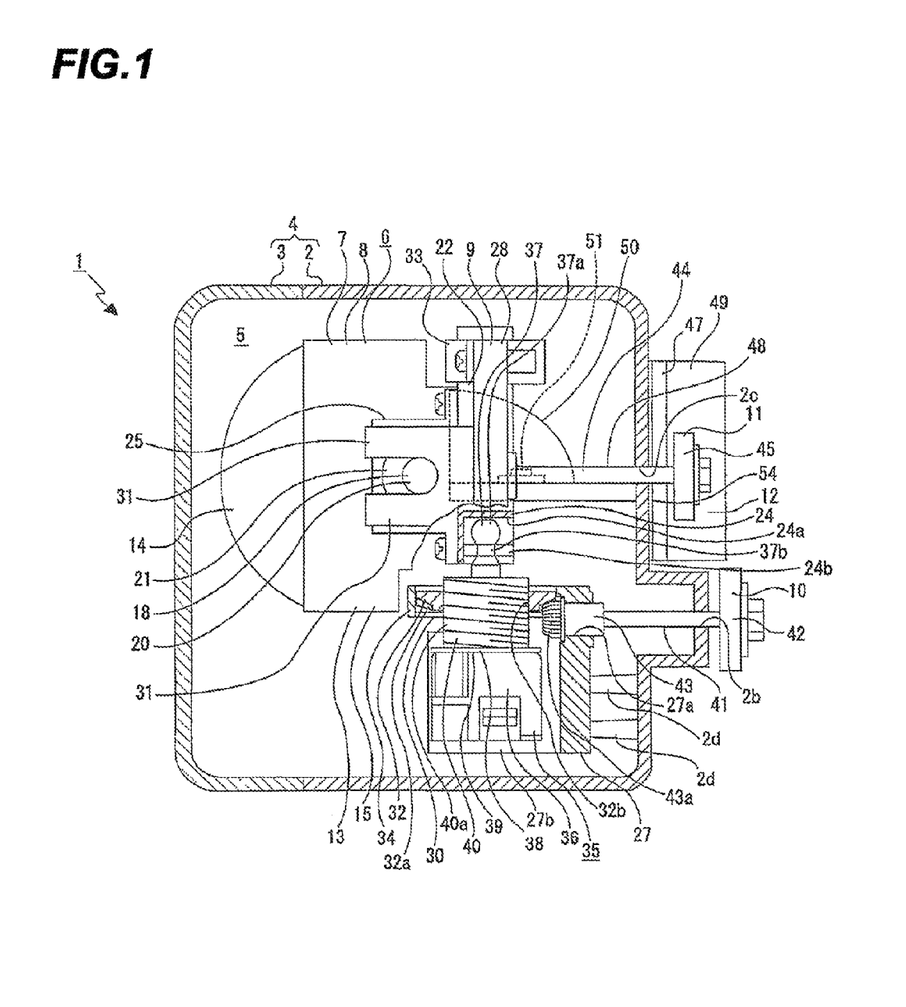
FIG. 1, together with FIGS. 2 to 7, shows an exemplary embodiment of a vehicular headlamp of the present disclosure and is a schematic side view of the vehicular headlamp illustrating an external case of a lamp as a cross section.

Vehicular headlamp 1 includes a lamp housing 2 having a concave portion opened to the front and a cover 3 that closes an opening of lamp housing 2, as shown in FIG. 1. An external case 4 of a lamp is constituted by lamp housing 2 and cover 3, and an internal space of external case 4 is formed as a lamp chamber 5.

An attachment hole 2a which is penetrated forward and rearward is formed at a rear end portion of lamp housing 2. See, for example, FIG. 2 of the present disclosure. Shaft insertion holes 2b and 2c that are penetrated forward and rearward are formed at the rear end portion of lamp housing 2. Shaft insertion hole 2b is positioned below attachment hole 2a and shaft insertion hole 2c is positioned on the side of attachment hole 2a. See, for example, FIGS. 1 and 2 of the present disclosure.

Figure 2:
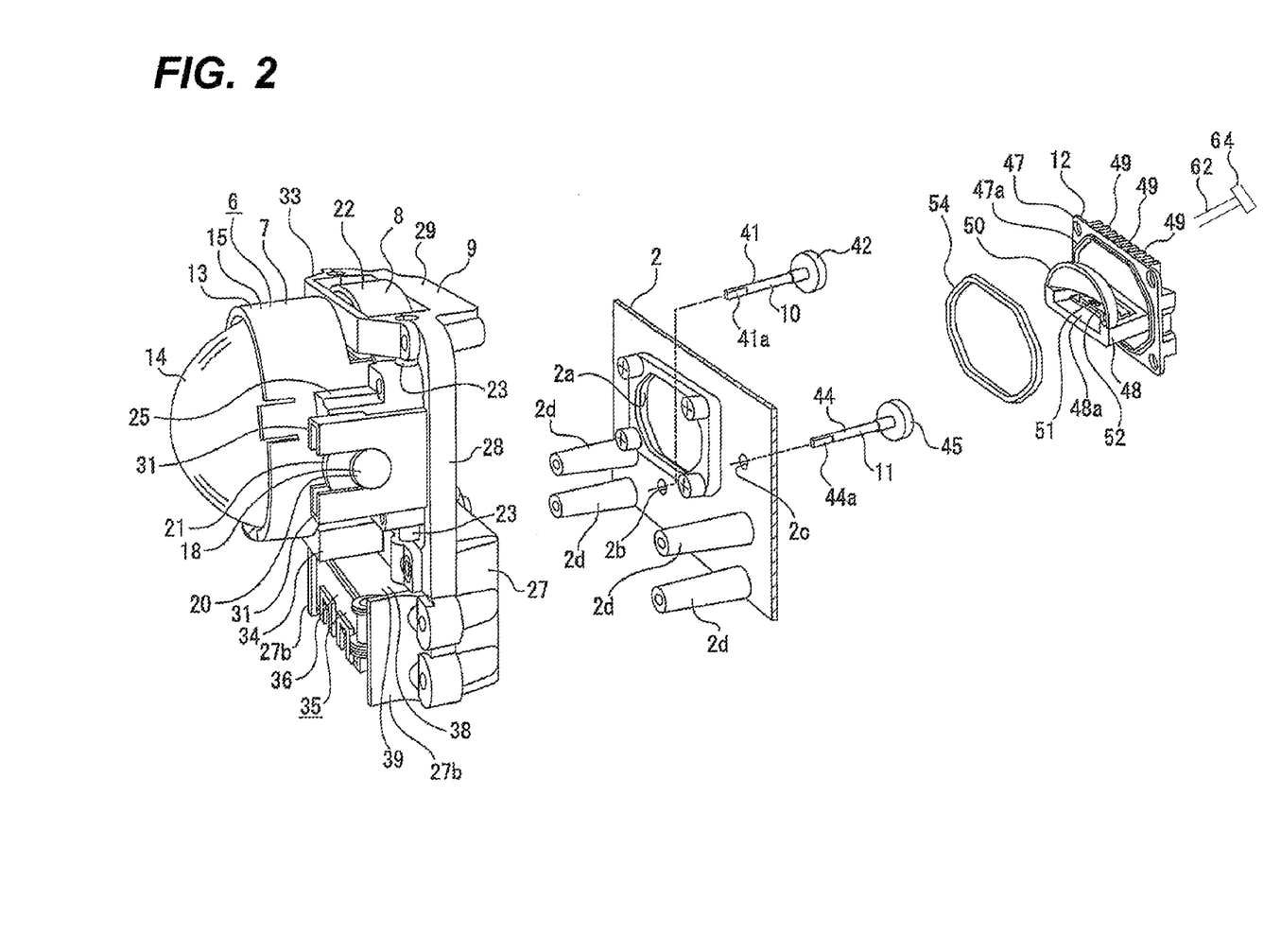
FIG. 2 is an exploded perspective view illustrating the vehicular headlamp of which some parts are omitted.

Attachment shaft portions 2d that protrude forward in lamp housing 2 are provided to be spaced apart from each other vertically and horizontally.

A lamp unit 6 is disposed in external case 4. See, for example, FIGS. 1 and 2 of the present disclosure.

Lamp unit 6 includes a lens unit 7, a movable frame 8, a fixation frame 9, a first aiming operating shaft 10, a second aiming operating shaft 11, and a light source unit 12. See, for example, FIGS. 1 to 3 of the present disclosure.

Figure 3:
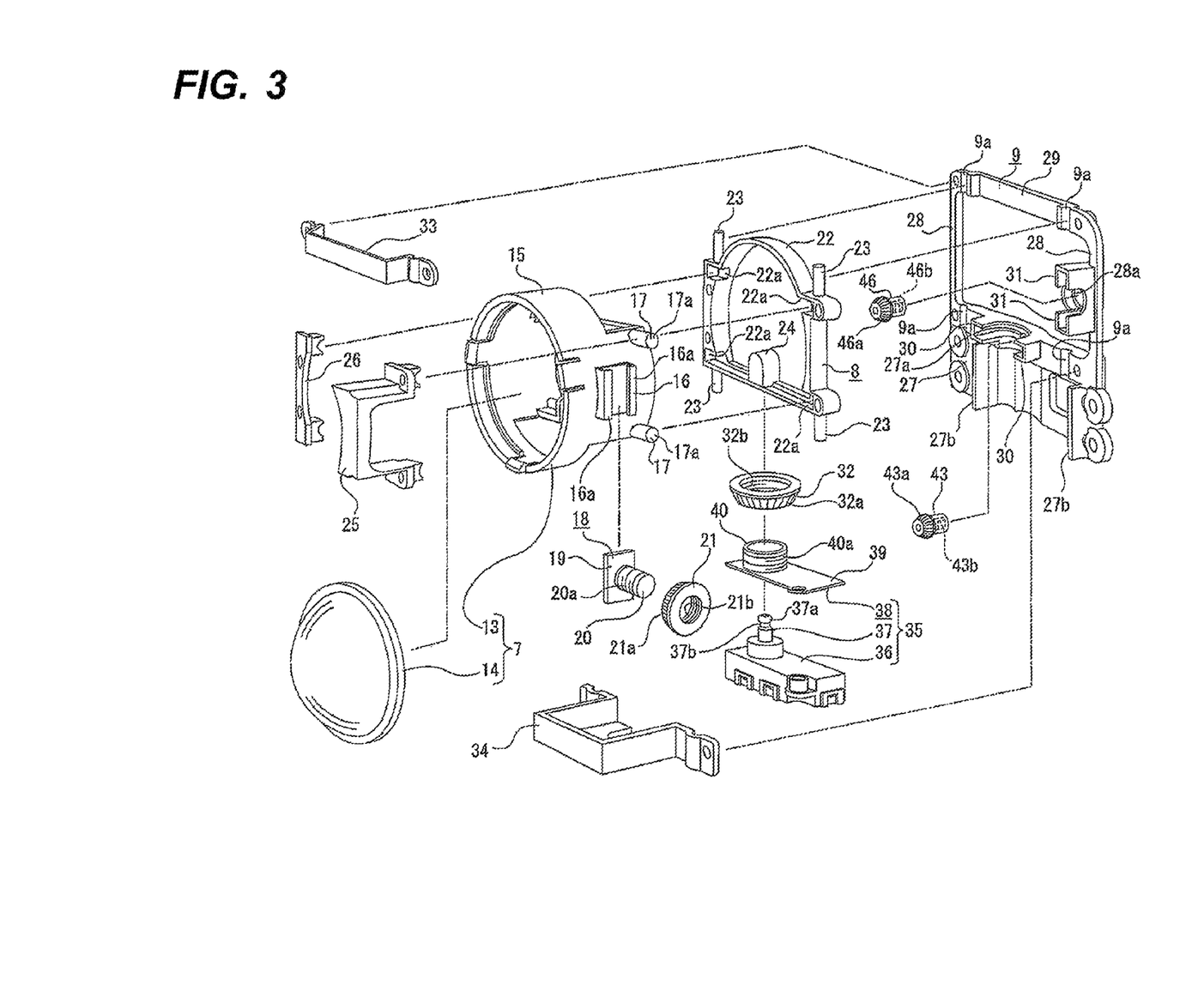
FIG. 3 is an exploded perspective view illustrating a lens unit and a movable frame.

Lens unit 7 includes a lens holder 13 and a projection lens 14 that is attached to a front end portion of lens holder 13. Lens holder 13 is constituted by a holder part 15 of which a front end portion has a cylindrical shape, a slide part 16 that is provided on one side of holder part 15, and supported shafts 17, 17 that are provided at a rear end portion of holder part 15.

Both front and rear end portions of slide part 16 are provided as slide movement portions 16a, 16a that extend vertically, and grooves opened vertically and inwardly are formed in slide movement portions 16a, 16a, respectively.

Supported shafts 17, 17 are horizontally provided by two in each of the left and right sides, while being spaced vertically by horizontally penetrating holder part 15 and both left and right end portions protrude outwards from both left and right side surfaces of holder part 15. Both left and right end portions of supported shafts 17, 17 are provided as supported portions 17a, respectively.

As described above, two supported shafts 17, 17 are provided to be penetrated into the holder part 15, and as a result, rigidity of lens unit 7 may be improved.

A connection member 18 is connected to slide part 16 of lens holder 13. Connection member 18 is constituted by a plate-like connection part 19 that faces a horizontal direction and a screw joining shaft 20 that protrudes to the side from connection part 19. A spiral groove 20a is formed on an outer peripheral surface of screw joining shaft 20. Connection member 18 is connected to slide part 16 by inserting both the front and rear end portions of connection part 19 into slide movement portions 16a, 16a, respectively.

Connection member 18 is not movable in a vertical direction as described below and lens holder 13 is movable in the vertical direction with respect to connection member 18.

A gear 21 is screw-joined to screw joining shaft 20 of connection member 18. Gear 21 is a bevel gear having a substantially annular shape, and has a gear portion 21a on an outer surface and a spiral groove portion 21b on an inner peripheral surface. Spiral groove portion 21b of gear 21 is screw-joined to a spiral groove 20a of screw joining shaft 20.

When gear 21 rotates, spiral groove 20a of screw joining shaft 20 is transferred, such that lens unit 7 moves horizontally according to a rotation direction of gear 21.

Movable frame 8 is constituted by a supporting frame part 22 formed in a frame type, connection shafts 23 that protrude vertically from supporting frame part 22, and a connection protruded part 24 that protrudes upward from the center in the horizontal direction of the bottom of supporting frame part 22.

Shaft supporting concave portions 22a that are spaced vertically and horizontally to be opened forward and inward are formed in supporting frame part 22.

Two connection shafts 23 are provided in each of up and down position to be spaced apart horizontally from each other.

A connection concave portion 24a opened rearward and downward is formed in connection protruded part 24. See, for example, FIG. 1 of the present disclosure. Protruded portions 24b, 24b that protrude to be proximate to each other are provided to be spaced apart horizontally on the bottom of connection protruded part 24.

Figure 4:
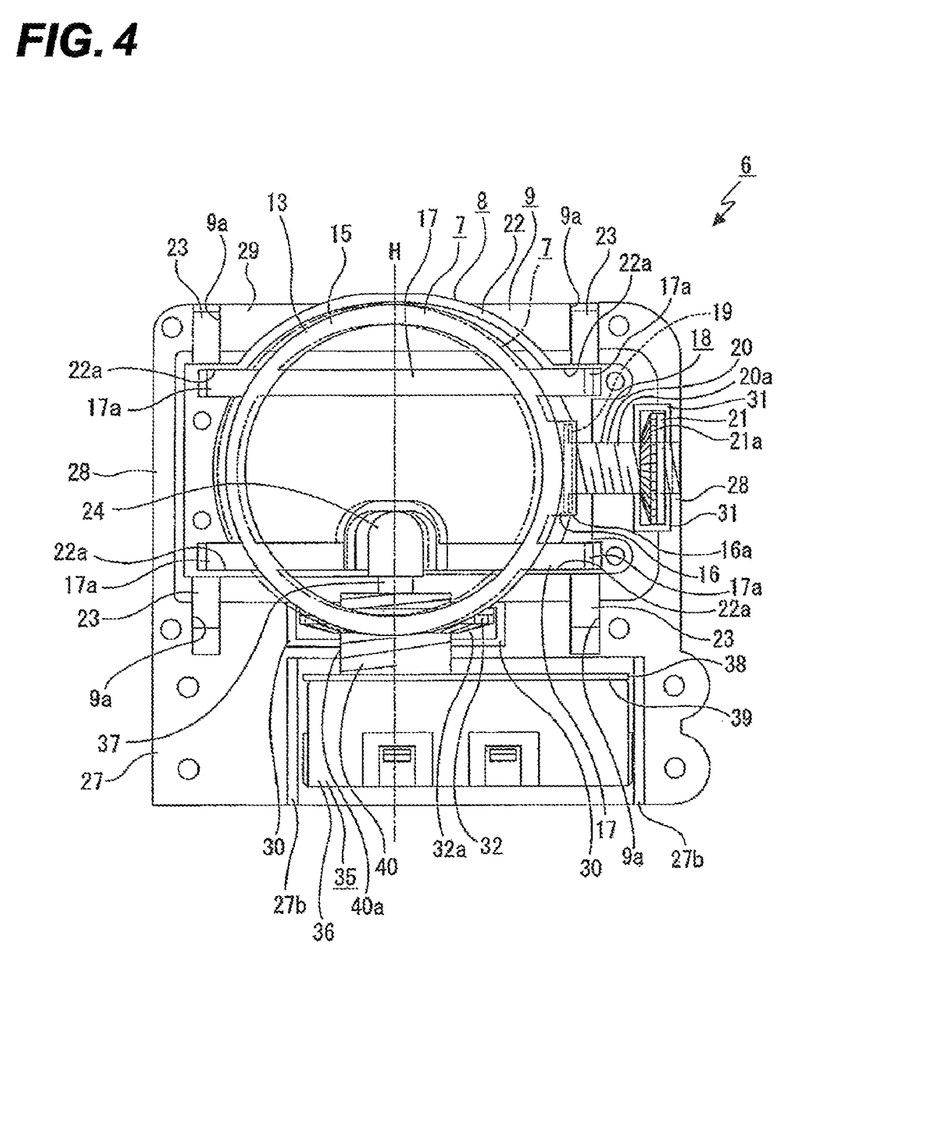
FIG. 4 is a front view illustrating the lens unit and the movable frame.

Lens unit 7 is supported on movable frame 8 to be movable in the horizontal direction. See, for example, FIGS. 1 to 3 of the present disclosure. Lens unit 7 is supported on movable frame 8 in a state where supported portions 17a of supported shafts 17, 17 are inserted into shaft supporting concave portions 22a from the front, respectively, and supported portions 17a are capable of sliding at shaft supporting concave portions 22a, respectively. See, for example, FIG. 4 of the present disclosure.

When lens unit 7 is supported on movable frame 8, a first holding member 25 and a second holding member 26 are attached to both left and right end portions of supporting frame part 22 of movable frame 8 from the front by, for example, screw-fixation, respectively. See, for example FIG. 3 of the present disclosure. First holding member 25 and second holding member 26 are attached to supporting frame part 22, thereby preventing supported shafts 17, 17 from being removed from shaft supporting concave portions 22a.

As shown in FIGS. 1 to 4, fixation frame 9 has a base part 27 that faces forward and backward direction, side parts 28, 28 that protrude upward from both left and right end portions of base part 27, and a top part 29 provided between upper end portions of side parts 28, 28.

A member insertion hole 27a is formed on the upper end portion of base part 27 and member insertion hole 27a is positioned at the center in the horizontal direction. Restriction pieces 27b, 27b that protrude forward are provided in base part 27, and restriction pieces 27b, 27b are positioned to be extend vertically and spaced apart horizontally.

Gear supporting protruded portions 30, 30 that protrude forward are provided on the upper end portion of base part 27, and gear supporting protruded portions 30, 30 are positioned at the left and right sides of member insertion hole 27a.

A member insertion hole 28a is formed on one side part 28 and member insertion hole 28a is positioned at the center in the vertical direction. Supporting protruded portions 31, 31 that protrude forward are provided on side parts 28 and supporting protruded parts 31, 31 are positioned at the upper and lower sides in member insertion hole 28a.

Supporting concave portions 9a opened to the front are formed to be spaced from each other horizontally on the upper end portion of base part 27 and top part 29 in fixation frame 9, respectively.

Fixation frame 9 is fixed to lamp housing 2 by coupling base part 27 to attachment shaft portions 2d by, for example, screw-fixation.

Movable frame 8 is supported on fixation frame 9 to be movable in a vertical direction. Movable frame 8 is supported on fixation frame 9 in a state where connection shafts 23 are inserted into supporting concave portions 9a from the front, respectively, and connection shafts 23 are supported on supporting concave portions 9a to be slidable, respectively. See, for example, FIG. 4 of the present disclosure.

In a state where lens unit 7 is supported on movable frame 8 and movable frame 8 is supported on fixation frame 9, gear 21 is inserted into supporting protruded portions 31, 31 from the front, and as a result, gear 21 is rotatable with respect to supporting protruded portions 31, 31 while gear 21 is not movable in the horizontal direction.

A driving gear 32 is supported on gear supporting protruded portions 30, 30 of fixation frame 9. Driving gear 32 is a bevel gear having a substantially annular shape, and has a gear portion 32a on an outer surface and a spiral groove portion 32b on an inner peripheral surface.

In a state where lens unit 7 is supported on movable frame 8 and movable frame 8 is supported on fixation frame 9, driving gear 32 is inserted into gear supporting protruded portions 30, 30 from the front. Driving gear 32 is rotatable with respect to gear supporting protruded portions 30, 30 while driving gear 32 is not movable in the vertical direction.

When movable frame 8 is supported on fixation frame 9, a third holding member 33 and a fourth holding member 34 are attached to top part 29 and the upper end portion of base part 27 from the front by, for example, screw-fixation, respectively. See, for example, FIG. 3 of the present disclosure. Third holding member 33 and fourth holding member 34 are attached to top part 29 and base part 27, respectively, thereby preventing connection shafts 23 from being removed from supporting concave portions 9a.

A leveling actuator 35 is attached to movable frame 8. See, for example, FIGS. 1, 3, and 4 of the present disclosure. Leveling actuator 35 has a body part 36, a driving part 37 that moves vertically with respect to body part 36, and a joining body 38 joined to body part 36.

Body part 36 has a driving mechanism (not shown) for moving driving part 37 in the vertical direction therein.

Driving part 37 has a substantially shaft shape that extends vertically. In driving part 37, an upper end portion is provided as a spherical connection portion 37a and a portion which extends from below spherical connection portion 37a is provided as a narrow portion 37b with a diameter decreased.

Joining body 38 is constituted by a joining plate part 39 that faces the vertical direction and a cylindrical screw joining barrel 40 that protrudes upward from joining plate part 39. A spiral groove 40a is formed on an outer peripheral surface of screw joining barrel 40. Joining plate part 39 of joining body 38 is joined onto the top surface of body part 36 by, for example, screw fixation.

Driving part 37 protrudes upward from screw joining barrel 40 in a state where joining body 38 is joined to body part 36.

Driving part 37 is inserted into connection concave portion 24a of connection protruded portion 24, such that leveling actuator 35 is connected to movable frame 8. See, for example, FIG. 1 of the present disclosure. In this case, narrow portion 36b is inserted between protruded portions 24b, 24b, such that driving part 37 is prevented from being removed from movable frame 8.

In leveling actuator 35, both left and right sides of body part 36 are positioned to be proximate to restriction pieces 27b, 27b on a front surface side of base part 27, respectively, (see, for example, FIG. 4 of the present disclosure) and rotation of leveling actuator 35 in a shaft circumferential direction of driving part 37 is restricted by restriction pieces 27b, 27b.

In joining body 38, spiral groove 40a of screw joining barrel 40 is screw-joined to spiral groove portion 32b of driving gear 32.

Therefore, when driving gear 32 rotates, spiral groove 40a of screw joining barrel 40 is transferred. And movable frame 8, lens unit 7, and leveling actuator 35 move in the vertical direction integrally with each other according to the rotation direction of driving gear 32.

When driving part 37 of leveling actuator 35 moves in the vertical direction, movable frame 8 and lens unit 7 move in the vertical direction integrally with each other according to the movement direction of driving part 37.

First aiming operating shaft 10 is constituted by a shaft part 41 that extends forward and rearward, and a rotation operating part 42 that is continued to a rear end of shaft part 41. A front end portion of shaft part 41 is provided with a rotation stopping portion 41a having a non-circular shape. See, for example, FIG. 2 of the present disclosure.

In first aiming operating shaft 10, shaft part 41 is inserted and penetrated into shaft insertion hole 2b formed in a lower side of lamp housing 2, and rotation stopping portion 41a is connected to a first connection member 43.

First connection member 43 has a gear portion 43a at a front end portion thereof. See, for example, FIG. 3 of the present disclosure. A joining hole 43b having a non-circular shape, which is opened rearward, is formed in first connection member 43.

Rotation stopping portion 41a is inserted into joining hole 43b, such that first aiming operating shaft 10 is connected to first connection member 43. Therefore, when first aiming operating shaft 10 is rotated in the shaft circumferential direction by operating rotation operating part 42, first connection member 43 rotates integrally with first aiming operating shaft 10.

Figure 5:
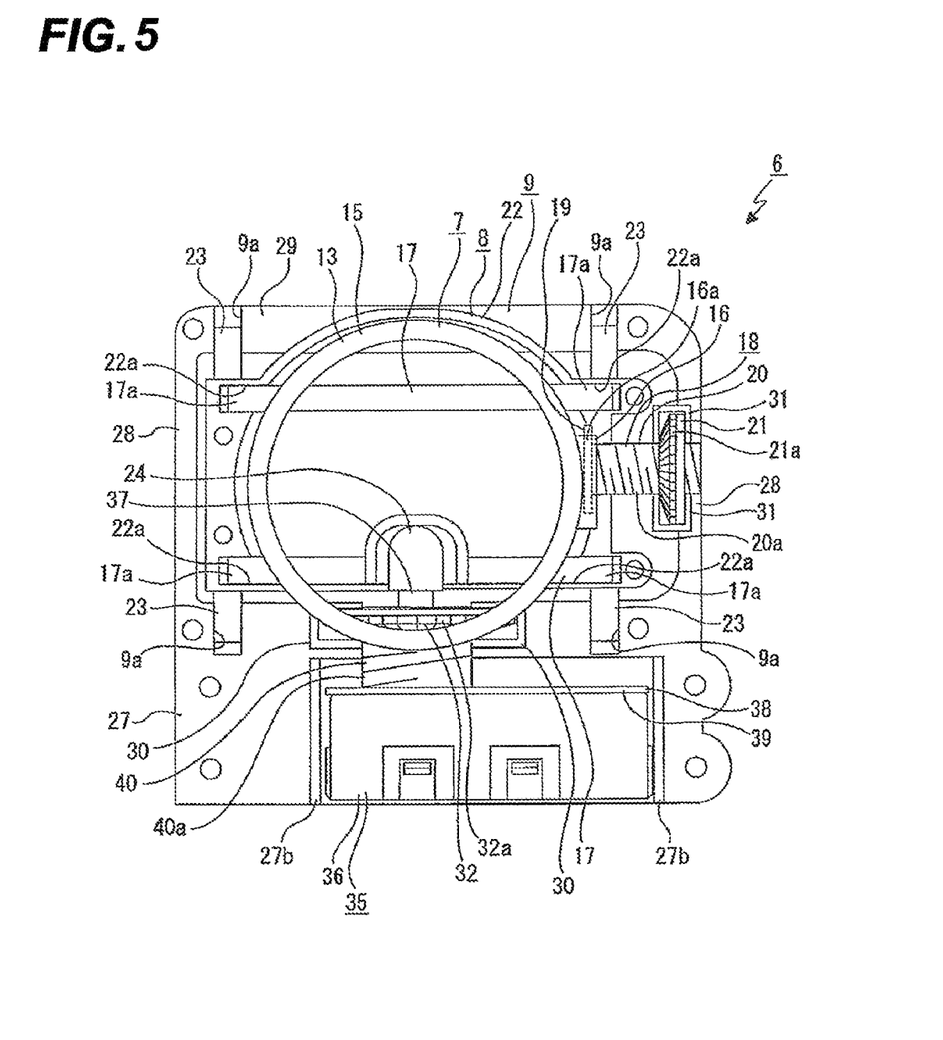
FIG. 5 is a front view illustrating a state where an aiming adjustment is performed in a vertical direction.

First connection member 43 is inserted and penetrated into member insertion hole 27a of fixation frame 9 from the front and engages with driving gear 32 screw-joined to screw joining barrel 40 of leveling actuator 35. See, for example, FIG. 1 of the present disclosure. Therefore, when first aiming operating shaft 10 rotates to rotate first connection member 43, driving gear 32 rotates in a direction according to the rotation direction of first aiming operating shaft 10, spiral groove 40a of screw joining barrel 40 is transferred, and connection shafts 23 are guided to supporting concave portions 9a, respectively, such that movable frame 8, lens unit 7, and leveling actuator 35 move in the vertical direction integrally with each other. See, for example, FIG. 5 of the present disclosure.

When movable frame 8, lens unit 7, and leveling actuator 35 move in the vertical direction integrally with each other, slide part 16 provided on lens holder 13 of lens unit 7 slides vertically with respect to connection member 18.

Therefore, when lens unit 7 moves in the vertical direction, an unnecessary load is not applied to lens unit 7 from connection member 18, such that movable frame 8, lens unit 7, and leveling actuator 35 may smoothly move in the vertical direction.

Lens unit 7 moves in the vertical direction by operating first aiming operating shaft 10, such that aiming adjustment in the vertical direction is performed.

Figure 6:
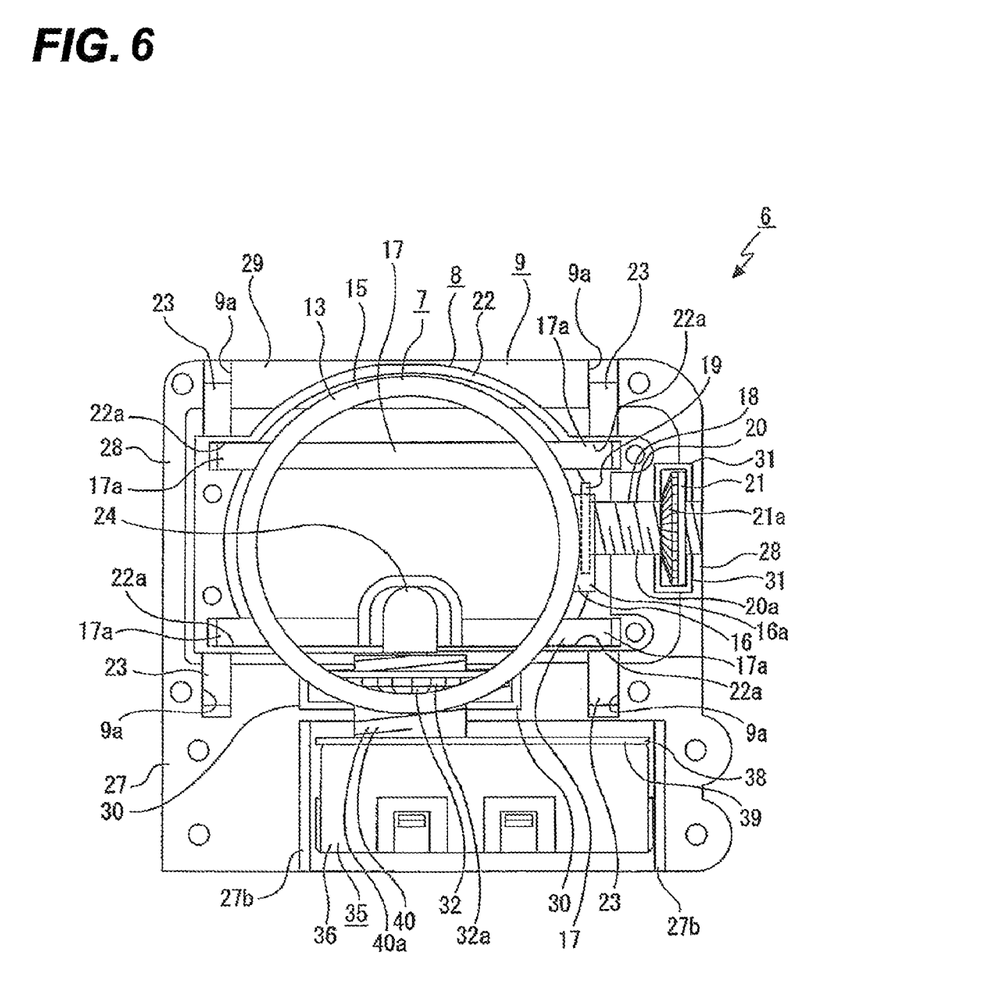
FIG. 6 is a front view illustrating a state where a leveling adjustment is performed.

Driving part 37 of leveling actuator 35 moves in the vertical direction, such that movable frame 8 and lens unit 7 move in the vertical direction integrally with each other according to the movement direction of driving part 37, as described above. See, for example, FIG. 6 of the present disclosure.

Lens unit 7 moves in the vertical direction by driving leveling actuator 35, such that leveling adjustment is performed.

In the aiming adjustment and the leveling adjustment as described above, lens unit 7 moves with respect to fixation frame 9 in the horizontal direction and the vertical direction in a state where the distance from a focus of the light emitted from a light source 51 and reflected by a reflector 50 to projection lens 14 is constant.

Second aiming operating shaft 11 is constituted by a shaft part 44 that extends forward and rearward, and a rotation operating part 45 that is continued to a rear end of shaft part 44. A front end portion of shaft part 44 is provided with a rotation stopping portion 44a having a non-circular shape. See, for example, FIG. 2 of the present disclosure.

In second aiming operating shaft 11, shaft part 44 is inserted and penetrated into shaft insertion hole 2c formed in a lower side of lamp housing 2, and rotation stopping portion 44a is connected to a second connection member 46.

Second connection member 46 has a gear portion 46a at a front end portion thereof. See, for example, FIG. 3 of the present disclosure. A joining hole 46b having a non-circular shape, which is opened rearward, is formed in second connection member 46.

Rotation stopping portion 44a is inserted into joining hole 46b, such that second aiming operating shaft 11 is connected to second connection member 46. Therefore, when second aiming operating shaft 11 is rotated in the shaft circumferential direction by operating rotation operating part 45, second connection member 46 rotates integrally with second aiming operating shaft 11.

Second connection member 46 is inserted and penetrated into member insertion hole 28a of fixation frame 9 from the front and engages with gear 21 screw-joined to screw joining shaft 20 of connection member 18 connected to lens unit 7. See, for example, FIG. 1 of the present disclosure. Therefore, when second aiming operating shaft 11 rotates to rotate second connection member 46, gear 21 rotates in a direction according to the rotation direction of second aiming operating shaft 11, spiral groove 20a of screw joining shaft 20 is transferred, and supported portions 17a of supported shafts 17, 17 are guided to shaft supporting concave portions 22a, respectively, such that lens unit 7 moves in the horizontal direction. A movement state of lens unit 7 is represented by a virtual line in FIG. 4.

Lens unit 7 moves in the horizontal direction by operating second aiming operating shaft 11, such that aiming adjustment in the horizontal direction is performed.

In the above description, a leveling adjusting mechanism is provided in addition to the aiming adjusting mechanism, but only the aiming adjusting mechanism may be provided without the leveling adjusting mechanism. In this case, leveling actuator 35 is not provided in vehicular headlamp 1.

Figure 7:
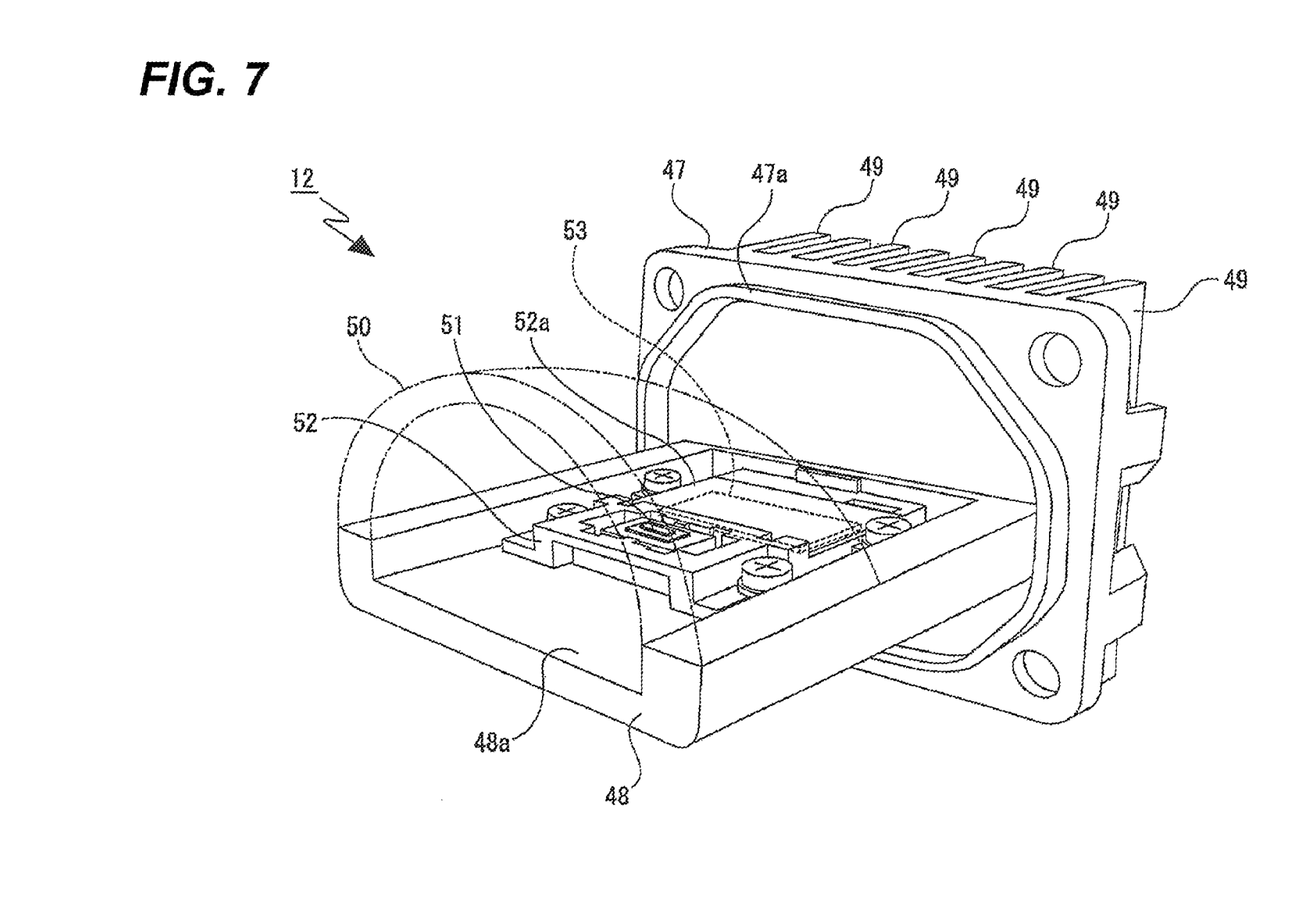
FIG. 7 is an enlarged perspective view of a light source unit.

As shown in FIGS. 2 and 7, light source unit 12 includes a plate-shaped fixed part 47 that faces forward and backward direction, a plate-shaped light source placing part 48 that protrudes forward from fixed part 47 to face the vertical direction, a plurality of heat sinks 49 that protrude rearward from fixed part 47, reflector 50 attached to light source placing part 48, and light source 51 placed in light source placing part 48.

An annular fitting portion 47a that protrudes forward is provided at fixed part 47 and fitting portion 47a is positioned so as to surround a rear end portion of light source placing part 48.

A placement concave portion 48a opened upward and forward is formed in light source displacing part 48. A holding body 52 is attached to placement concave portion 48a and holding body 52 is placed in light source placing part 48 in a state where light source 51 is held on holding body 52. As light source 51, for example, a light emitting diode (LED) may be used. Reflector 50 is attached to light source placing part 48 to cover light source 51 from the upper side.

Holding body 52 has a cover portion 52a. A driving circuit 53 that drives light source 51 is placed in holding body 52 and driving circuit 53 is closed from the upper side by cover portion 52a.

As described above, in vehicular headlamp 1, since driving circuit 53 and light source 51 driven by driving circuit 53 are provided in a single light source unit 12, a manufacturing cost can be reduced and miniaturization can be achieved.

Holding body 52 that holds light source 51 or driving circuit 53 may be formed integrally with light source placing part 48 and, in this case, an additional manufacturing cost can be reduced due to the reduction in the number of components.

Light source 51 and driving circuit 53 are placed in light source placing part 48, such that a connection cord for connecting light source 51 and driving circuit 53 is not required, thereby reducing the manufacturing cost due to the reduction in the number of components.

In light source unit 12, fixed part 47 is fixed to a rear end portion of lamp housing 2 from the rear side by, for example, the screw fixation in a state where a packing 54 made of, for example, rubber is attached to fitting portion 47a in an external fitting type. In a state where light source unit 12 is fixed to lamp housing 2, light source placing part 48 and reflector 50 are inserted into attachment hole 2a from the rear side, and light source placing part 48, reflector 50, light source 51, holding body 52, and driving circuit 53 are placed in lamp chamber 5. Heat sinks 49 of light source unit 12 are positioned outside (at the rear side of) external case 4.

A connector 62 which is connected to a power supply circuit 64 is connected to the rear end portion of lamp housing 2, and power is supplied to driving circuit 53 from the power supply circuit through the connector.

The connector 62 is positioned at the center in the horizontal direction of lamp housing 2 and is positioned above or below attachment hole 2a. The connector 62 is positioned at the center in the horizontal direction of lamp housing 2 to use the same lamp housing 2 in left and right vehicular headlamps 1, 1, thereby universalizing components in left and right vehicular headlamps 1, 1.

In the above description, an exemplary embodiment is illustrated in which shaft insertion hole 2b is formed below attachment hole 2a, shaft insertion hole 2c is formed on the side of attachment hole 2a, and shaft part 41 of first aiming operating shaft 10 and shaft part 44 of second aiming operating shaft 11 are inserted and penetrated into shaft insertion holes 2b, 2c, respectively.

However, shaft insertion hole 2b may also be formed on the side of attachment hole 2a similarly to shaft insertion hole 2c, and shaft part 41 of first aiming operating shaft 10 may be inserted and penetrated into shaft insertion hole 2b.

As such, shaft part 41 and shaft part 44 are inserted and penetrated into shaft insertion holes 2b, 2c formed on the side of attachment hole 2a, respectively, such that first aiming operating shaft 10 and second aiming operating shaft 11 may be positioned on the side (left side or right side) of a vertical line H (see, for example, FIG. 4 of the present disclosure) that passes through the center of projection lens 14, and rotation operating parts 42, 45 may be positioned on the side of the connector for supplying power to driving circuit 53.

Since rotation operating parts 42, 45 may rotate by being operated from the upper side or the lower side by a jig such as a driver, rotation operating parts 42, 45 may be positioned on the side of the connector as described above, and as a result, the connector may not interfere with the jig such as the driver when rotation operating parts 42, 45 are operated.

Accordingly, an excellent operability can be ensured when rotation operating parts 42, 45 are operated using the jig such as the driver.

As described above, in vehicular headlamp 1, light source unit 12 is fixed to lamp housing 2 and heat sinks 49 are positioned outside external case 4.

Accordingly, when the aiming adjustment is performed, heat sinks 49 do not move together with lens unit 7, such that heat dissipating performance can be improved after ensuring internal airtightness of external case 4.

Since heat sinks 49 are not provided inside external case 4, external case 4 may be downsized, and further, since the heat dissipating performance is high, heat sinks 49 may be downsized, thereby miniaturizing vehicular headlamp 1.

Since the heat dissipating performance can be improved, another heat dissipating member such as a heat dissipating fan is not required, thereby reducing the manufacturing cost due to the reduction in the number of components.

In vehicular headlamp 1, since lens unit 7 and light source unit 12 are configured as separate members, light source unit 12 may be singly replaced separately from lens unit 7 or singly attached to and detached from lamp housing 2, thereby improving maintenance performance.

In vehicular headlamp 1, in a state where the distance from the focus of the light emitted from light source 51 and reflected by reflector 50 to projection lens 14 is constant, lens unit 7 moves with respect to fixation frame 9 in the horizontal direction and the vertical direction, such that the aiming adjustment or leveling adjustment is performed.

Accordingly, the aiming adjustment or the leveling adjustment does not exert a bad influence on a light distributing pattern.

In the above described exemplary embodiment, lens unit 7 moves in the horizontal direction with respect to movable frame 8 at a horizontal aiming adjustment, and lens unit 7 and movable frame 8 move in the vertical direction with respect to fixation frame 9 at a vertical aiming adjustment. On the contrary, the lens unit and the movable frame may move in the horizontal direction with respect to the fixation frame at the horizontal aiming adjustment, and the lens unit may move in the vertical direction with respect to the movable frame at the vertical aiming adjustment.

In this case, a connection shaft that extends in the horizontal direction is provided in the movable frame, a supported shaft that extends in the vertical direction is provided in the lens unit and the lens unit moves in the vertical direction with respect to the movable frame, such that lens unit and movable frame may move in the horizontal direction with respect to the fixation frame. In this case, the lens unit may move in the vertical direction with respect to the movable frame by a rotation operation of one of first aiming operating shaft 10 and second aiming operating shaft 11, and the lens unit and the movable frame may move in the horizontal direction with respect to the fixation frame by a rotation operation of the other one of first aiming operating shaft 10 and second aiming operating shaft 11.

In the above described exemplary embodiment, fixation frame 9 is fixed to lamp housing 2, but, for example, a protruded portion that protrudes to the front is provided in the light source unit and fixation frame 9 may be fixed to the protruded portion.

In the above described exemplary embodiment, the light emitting diode is used as light source 51, but light source 51 is not limited to the light emitting diode, and as light source 51, another type of light source may be used which includes a discharge lamp such as, for example, a ceramic metal halide lamp.

In vehicular headlamp 1, first aiming operating shaft 10 rotates in the shaft circumferential direction, such that leveling actuator 35 moves in the vertical direction with respect to fixation frame 9 and lens unit 7 moves in the vertical direction with respect to fixation frame 9 according to the movement of leveling actuator 35.

Accordingly, the leveling adjustment and the aiming adjustment in the vertical direction may be independently performed without interfering with each other, and as a result, appropriateness and reliability of an optical axis adjusting operation can be improved.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular headlamp comprising:
    an external case of a lamp constituted by a lamp housing with an opening and a cover that covers the opening of the lamp housing; and
    a lamp unit disposed within the external case,
    the lamp unit includes:
        a light source unit including a light source, a light source placing part in which the light source is placed, a reflector that reflects light emitted from the light source, and a heat sink that dissipates heat generated when the light source is driven;
        a fixation frame fixed within the external case;
        a movable frame supported on the fixation frame to be movable in one of a horizontal direction and a vertical direction with respect to the fixation frame within the external case;
        a lens unit including a projection lens that projects the light emitted from the light source and a lens holder provided with a slide part holding the projection lens and supported on the movable frame to be movable in the other one of the horizontal direction and the vertical direction within the external case;
        a first aiming operating shaft configured to perform an optical axis adjustment by moving the movable frame in one of the horizontal direction and the vertical direction with respect to the fixation frame;
        a second aiming operating shaft configured to perform the optical axis adjustment by moving the lens unit in the other one of the horizontal direction and the vertical direction with respect to the movable frame;
        a connection member including a connection part connected to the lens unit and configured to be movable integrally with the lens unit in one of the horizontal direction and the vertical direction by operating the first aiming operating shaft or the second aiming operating shaft; and
        a leveling actuator including a body part and a driving part, that is movable in the vertical direction with respect to the body part and is connected to the movable frame or the lens unit, and configured to be movable in the vertical direction with respect to the fixation frame and perform the optical axis adjustment,
    wherein the lens unit moves in the horizontal direction and the vertical direction with respect to the fixation frame within the external case in a state where a distance from a focus of the light emitted from the light source and reflected by the reflector to the projection lens is constant,
    the light source unit is fixed to the lamp housing in a state where the heat sink is positioned outside the external case and configured such that the heat sink does not move together with the lens unit when the optical axis adjustment is performed, and
    each of the movable frame, the lens unit and the leveling actuator is configured to move in the vertical direction integrally with each other and the slide part of the lens holder of the lens unit is configured to slide vertically with respect to the connection member.

2. The vehicular headlamp of claim 1,
    wherein the first aiming operating shaft or the second aiming operating shaft rotates in a shaft circumferential direction, such that the leveling actuator moves in the vertical direction with respect to the fixation frame, and the lens unit moves in the vertical direction with respect to the fixation frame according to the movement of the leveling actuator.

3. The vehicular headlamp of claim 1, wherein the light source unit is provided with a driving circuit that drives the light source.

4. The vehicular headlamp of claim 2, wherein the light source unit is provided with a driving circuit that drives the light source.

5. The vehicular headlamp of claim 1,
    wherein the lens unit moves in the other direction of the horizontal direction and the vertical direction with respect to the connection member.

6. The vehicular headlamp of claim 2,
    wherein the lens unit moves in the other direction of the horizontal direction and the vertical direction with respect to the connection member.

7. The vehicular headlamp of claim 3,
wherein the lens unit moves in the other direction of the horizontal direction and the vertical direction with respect to the connection member.

8. The vehicular headlamp of claim 4,
wherein the lens unit moves in the other direction of the horizontal direction and the vertical direction with respect to the connection member.

9. The vehicular headlamp of claim 1, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

10. The vehicular headlamp of claim 2, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

11. The vehicular headlamp of claim 3, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

12. The vehicular headlamp of claim 4, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

13. The vehicular headlamp of claim 5, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

14. The vehicular headlamp of claim 6, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

15. The vehicular headlamp of claim 7, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

16. The vehicular headlamp of claim 8, wherein a connector that supplies driving current to the light source is attached to a portion positioned in a rear of a center of the projection lens in the lamp housing, and the first aiming operating shaft or the second aiming operating shaft is positioned at a left side or a right side of a vertical line that passes through the center of the projection lens.

* * * * *